(12) United States Patent
Fujimoto et al.

(10) Patent No.: US 8,669,305 B2
(45) Date of Patent: Mar. 11, 2014

(54) POLYAMIDEIMIDE-BASED FILM COATING COMPOSITION

(75) Inventors: Katsumi Fujimoto, Saitama (JP); Takao Hasegawa, Saitama (JP)

(73) Assignee: Valeo Japan Co., Ltd., Saitama (JP)

(*) Notice: Subject to any disclaimer, the term of this patent is extended or adjusted under 35 U.S.C. 154(b) by 125 days.

(21) Appl. No.: 13/231,112

(22) Filed: Sep. 13, 2011

(65) Prior Publication Data

US 2012/0065296 A1 Mar. 15, 2012

(30) Foreign Application Priority Data

Sep. 14, 2010 (JP) ................................. 2010-205609

(51) Int. Cl.
| | | |
|---|---|---|
| *C09D 179/08* | (2006.01) | |
| *C08K 3/04* | (2006.01) | |
| *C08K 3/10* | (2006.01) | |
| *C08K 3/30* | (2006.01) | |
| *C08K 5/02* | (2006.01) | |
| *C08K 5/07* | (2006.01) | |
| *C08K 5/1535* | (2006.01) | |
| *B32B 27/20* | (2006.01) | |
| *B32B 27/24* | (2006.01) | |
| *B32B 27/28* | (2006.01) | |

(52) U.S. Cl.
USPC .......... 523/454; 523/456; 523/458; 523/462; 523/468; 524/111; 524/360; 524/406; 524/419; 524/420; 524/524; 524/427; 524/590; 524/606

(58) Field of Classification Search
USPC .......... 523/454, 456, 458, 462, 468; 524/111, 524/360, 590, 606, 401, 406, 418, 419, 420, 524/424, 427
See application file for complete search history.

(56) References Cited

U.S. PATENT DOCUMENTS

| | | | |
|---|---|---|---|
| 5,486,299 A | 1/1996 | Fuwa et al. | |
| 2005/0165209 A1* | 7/2005 | Kurita et al. ............. | 528/310 |
| 2006/0199923 A1* | 9/2006 | Akiba et al. .............. | 525/476 |
| 2006/0240254 A1 | 10/2006 | Kikuchi et al. | |
| 2006/0240255 A1 | 10/2006 | Kikuchi et al. | |
| 2007/0262426 A1 | 11/2007 | Mahler | |
| 2008/0194437 A1 | 8/2008 | Murase et al. | |
| 2011/0240331 A1* | 10/2011 | Kikuchi et al. .......... | 174/110 R |

FOREIGN PATENT DOCUMENTS

| | | |
|---|---|---|
| CN | 1855316 A | 11/2006 |
| JP | 07-097517 | 4/1995 |
| JP | 2008-133410 | 6/2008 |

OTHER PUBLICATIONS

English language translation and abstract for JP07-097517 extracted from PAJ database Jul. 20, 2011 and Aug. 25, 2011, 36 pages.
English language translation and abstract for JP2008-133410 extracted from PAJ database Jul. 20, 2011 and Aug. 25, 2011, 38 pages.

* cited by examiner

*Primary Examiner* — Michael J Feely
(74) *Attorney, Agent, or Firm* — Howard & Howard Attorneys PLLC

(57) ABSTRACT

Disclosed is a polyamideimide-based film coating composition free from any restricted substance or a substance which might possibly be a restricted one such as N-methyl pyrrolidone and N-ethyl pyrrolidone and capable of replacing a conventional coating composition using a solvent such as N-methyl pyrrolidone. The polyamideimide-based film coating composition of the present invention is a polyamideimide-based film coating composition comprising a polyamideimide resin and a solvent, the polyamideimide resin being dissolved as a binder in the solvent, wherein the solvent contains γ-butyrolactone and cyclopentanone, and a volume of γ-butyrolactone is 50% by volume or more compared to a total volume of γ-butyrolactone and cyclopentanone.

4 Claims, 1 Drawing Sheet

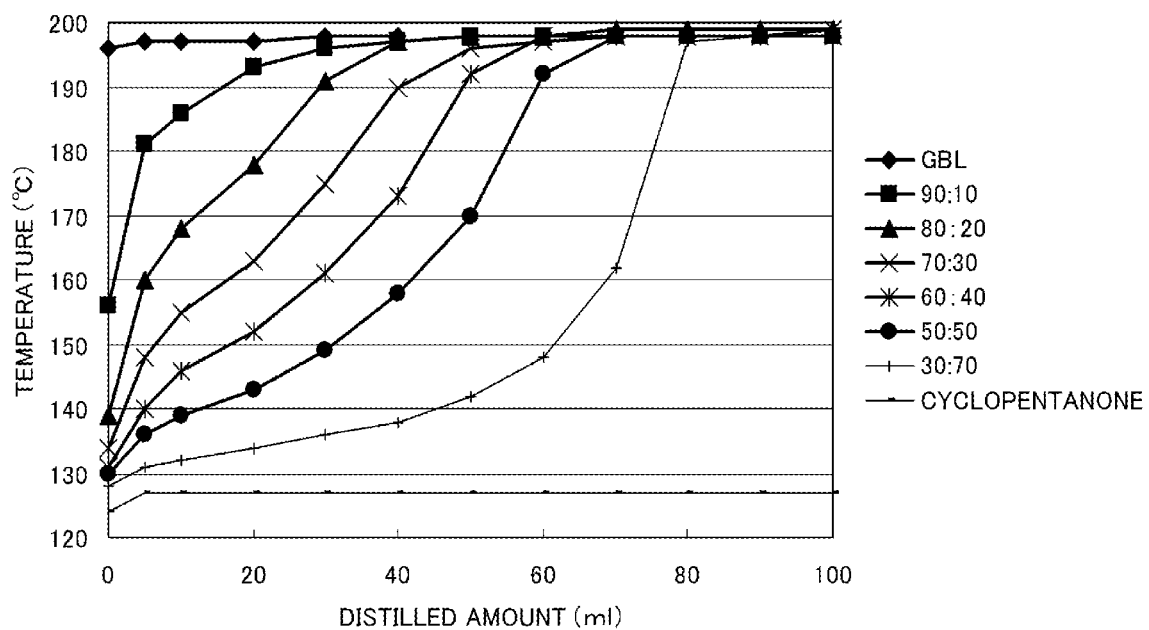

POLYAMIDEIMIDE-BASED FILM COATING COMPOSITION

RELATED APPLICATIONS

This application claims priority to and all the advantages of Japanese Patent Application No. JP2010-205609, filed on Sep. 14, 2010.

BACKGROUND OF THE INVENTION

1. Field of the Invention

The present invention relates to a polyamideimide-based (PAI-based) film coating composition, in particular a polyamideimide-based film coating composition free from any restricted substance or a substance which might possibly be restricted.

2. Description of Related Art

The polyamideimide resin (PAI) has excellent heat resistance, chemical resistance, mechanical properties at high temperature, wear resistance and sliding characteristics, and therefore is widely used as a binder for various coating compositions such as heat-resistant coating composition, chemical-resistant coating composition, lubricant composition, and heat-resistant and insulating coating composition.

As the polyamideimide resin has a high polarity, only a limited number of solvents are known to have a high affinity for it. Conventionally, as a solvent having a high polyamideimide resin-dissolving property, N-methyl pyrrolidone (NMP) has been mainly used (see, for example, Patent Document 1).

Further, a method of obtaining a solution of polyamideimide resin by synthesizing a polyamideimide resin in a mixture solvent of γ-butyrolactone (GBL) and N-methyl pyrrolidone is known (see, for example, Patent Document 2).

Patent Document 1: JP-A No. 07-97517
Patent Document 2: JP-A No. 2008-133410

However, N-methyl pyrrolidone is recognized as a restricted substance which has a potentially adverse effect on a living body, and therefore its use may be restricted. For such reasons, studies have been made on a replacement substance and examples of the candidate include N-ethyl pyrrolidone (NEP). However, as the structure of N-ethyl pyrrolidone is similar to that of N-methyl pyrrolidone, there may have a risk of similar adverse effect on a living body, and therefore there is also a possibility that its use is restricted depending on further studies in future.

Although γ-butyrolactone can dissolve the polyamideimide resin, since it has a high boiling point of 204° C., the following problem arises. That is, a poor drying property is yielded and a leveling property is deteriorated when only γ-butyrolactone is used as a solvent which impairs coating property, when only γ-butyrolactone is used as a solvent.

SUMMARY OF THE INVENTION

Under the circumstances, an object of the invention is to provide a polyamideimide-based film coating composition free from any restricted substance or a substance which might possibly be a restricted one such as N-methyl pyrrolidone and N-ethyl pyrrolidone and capable of replacing a conventional coating composition using a solvent such as N-methyl pyrrolidone.

A polyamideimide-based film coating composition according to the present invention is a polyamideimide-based film coating composition comprising a polyamideimide resin and a solvent, the polyamideimide resin being dissolved as a binder in the solvent, wherein the solvent contains γ-butyrolactone and cyclopentanone, and a volume of γ-butyrolactone is 50% by volume or more compared to a total volume of γ-butyrolactone and cyclopentanone.

The polyamideimide-based film coating composition according to the present invention preferably has the volume of γ-butyrolactone being 95% by volume or less compared to the total volume of γ-butyrolactone and cyclopentanone. A coating composition having an excellent coating property and drying property can be provided. In addition, the baking temperature can be lowered.

In the polyamideimide-based film coating composition according to the present invention, a solid lubricating agent is preferably contained. A coating composition having excellent sliding characteristics can be provided.

In the polyamideimide-based film coating composition according to the present invention, the solid lubricating agent is preferably at least one of molybdenum disulfide, polytetrafluoroethylene, and graphite. Sliding characteristics improve so that an excellent coating composition can be provided.

In the polyamideimide-based film coating composition according to the present invention, an epoxy resin is preferably further contained. Wear resistance improves so that an excellent coating composition can be provided.

According to the invention, a polyamideimide-based film coating composition free from any restricted substance or a substance which might possibly be a restricted one such as N-methyl pyrrolidone and N-ethyl pyrrolidone and capable of replacing a conventional coating composition using a solvent such as N-methyl pyrrolidone is provided.

BRIEF DESCRIPTION OF THE DRAWING

FIG. 1 is a graph illustrating a change in the distillation temperature of γ-butyrolactone, cyclopentanone, and their mixtures.

DETAILED DESCRIPTION OF EMBODIMENTS

Herein below, the invention is explained in greater detail in view of embodiments of the invention, but it is not intended to limit the invention to the descriptions given below. The embodiments may vary in wide range as long as the effect of the invention is envisaged by them.

The polyamideimide-based film coating composition related to the embodiment is a polyamideimide-based film coating composition comprising a polyamideimide resin and a solvent, the polyamideimide resin being dissolved as a binder in the solvent, wherein the solvent contains γ-butyrolactone and cyclopentanone, and a volume of γ-butyrolactone is 50% by volume or more compared to a total volume of γ-butyrolactone and cyclopentanone.

The polyamideimide resin is a polymer having an amide bond and an imide bond in a molecule, and it has both the processability and toughness originating from an amide bond and the heat resistance and mechanical strength originating from an imide bond. The polyamideimide resin can be produced according to method that is commonly used in the art. Examples of the method include an isocyanate method, an acid chloride method, and a direct polymerization method. The embodiment of the invention is not limited by the method of producing a polyamideimide resin. According to each polymerization method, molecular weight is increased by polymerization based on an amide bond. At the same time as or after the increasing the molecular weight, imidation occurs in a molecule such as amide acid moiety, and as a result a desired polyamideimide is obtained as dissolved in a solvent. Of the methods, from the viewpoint of polymerization property, cost, and load to environment, the isocyanate method is preferred. Meanwhile, the polyamideimide resin includes a polyamideimide resin in which every amide acid moiety is imidated (herein below, referred to as "complete reaction-type polyamideimide resin") and a polyamideimide resin in which non-imidated amide acid moiety is contained (herein below, referred to as "incomplete reaction-type polyamideimide resin"). According to the embodiment of the invention, the complete reaction-type polyamideimide resin is preferred as polyamideimide resin. By having the complete reaction-type polyamideimide resin, friction coefficient of a coating film can be further lowered.

The polyamideimide resin may be used in the form of powder or pellet that is isolated from a polymerization solution of a polyamideimide resin or in the form of a varnish containing the polymerization solution of the polyamideimide resin either as it is or after the dilution of it. A commercially available product of the polyamideimide resin in the form of powder, pellet, or varnish can be used. When the polyamideimide resin in the form of varnish is used, it is preferable to use a varnish which uses, as a polymerization solvent, a solvent other than a restricted substance or a substance which might possibly be a restricted one such as N-methyl pyrrolidone and N-ethyl pyrrolidone. More preferably, a varnish in which γ-butyrolactone is used as a solvent is used. Examples of a commercially available varnish in which γ-butyrolactone is used as a solvent is used include HPC5030 (trade name, manufactured by Hitachi Chemical Company, Ltd.).

According to the polyamideimide-based film coating composition of the embodiment of the invention, content of the polyamideimide resin is preferably between 40 and 85 parts by weight compared to 100 parts by weight of the total solid components in the coating composition. More preferably, it is between 50 and 70 parts by weight. When it is less than 40 parts by weight, wear resistance may become insufficient. On the other hand, when it is more than 85 parts by weight, friction coefficient may be lowered.

According to the polyamideimide-based film coating composition of the embodiment of the invention, γ-butyrolactone and cyclopentanone are contained as a solvent. Although γ-butyrolactone can dissolve the polyamideimide resin, it has boiling point of 204° C., and therefore when only γ-butyrolactone is used as a solvent, there is a tendency that it takes time for drying and further a coating property is poor. In addition, as it is necessary to have higher baking temperature compared to a conventional coating composition using N-methyl pyrrolidone, etc. (herein below, referred to as a "conventional coating composition"), it is often required to change the process, and therefore inappropriate as a replacement.

FIG. 1 is a graph which illustrates a change in distillation temperature of γ-butyrolactone, cyclopentanone, and their mixture. Inventors of the invention mixed γ-butyrolactone with cyclopentanone having boiling point of 130° C. in any proportion and evaluated the distillation characteristics of the mixture. As a result, it was found that smaller the mixing ratio of γ-butyrolactone (i.e., higher the mixing ratio of cyclopentanone), lower the initial boiling point tends to become. When the volume of γ-butyrolactone is 70% by volume or less compared to 100% by volume of the total volume of γ-butyrolactone and cyclopentanone, it was confirmed that the initial boiling point of the mixture is close to the initial boiling point of cyclopentanone alone. Thus, by using γ-butyrolactone and cyclopentanone as a solvent for coating composition, effective drying can be achieved and the amount of residual solvent can be reduced. It is believed that the mechanism related to lower initial boiling point is based on azeotropy. As such, by using γ-butyrolactone and cyclopentanone as a solvent for coating composition, a more homogenous coating film can be obtained without having rapid drying and elimination of a solvent.

As discussed in detail above, γ-butyrolactone plays a role of dissolving mainly the polyamideimide resin and cyclopentanone plays a role of improving a drying property by controlling viscosity or accelerating dispersion of a solid lubricating agent. The volume of γ-butyrolactone is 50% by volume or more compared to the total volume of γ-butyrolactone and cyclopentanone. More preferably, the volume of γ-butyrolactone is 60% by volume or more, and particularly preferably 70% by volume or more compared to the total volume of γ-butyrolactone and cyclopentanone. When the volume of γ-butyrolactone is less than 50% by volume compared to the total volume of γ-butyrolactone and cyclopentanone, solubility of the polyamideimide resin is impaired.

According to the polyamideimide-based film coating composition of the embodiment of the invention, the volume of γ-butyrolactone is preferably 95% by volume or less compared to the total volume of γ-butyrolactone and cyclopentanone. More preferably, the volume of γ-butyrolactone is 90% by volume or less, and particularly preferably 80% by volume or less compared to the total volume of γ-butyrolactone and cyclopentanone. When the volume of γ-butyrolactone is more than 95% by volume compared to the total volume of γ-butyrolactone and cyclopentanone, the drying property and coating property may be impaired. In addition, the temperature required for baking may be higher than that of a conventional coating composition.

The polyamideimide-based film coating composition of the embodiment of the invention may contain an additional solvent other than γ-butyrolactone and cyclopentanone. Examples of other solvent include methyl isobutyl ketone (MIBK), methyl ethyl ketone (MEK), acetone, ethanol, diacetone alcohol, and cyclohexanone. In this regard, it is preferable that the total volume of γ-butyrolactone and cyclopentanone is 90% by volume or more compared to the total volume of the solvent. More preferably, it is 95% by volume or more. Particularly preferably, it is 100% by volume, i.e., only γ-butyrolactone and cyclopentanone are contained as a solvent.

According to the polyamideimide-based film coating composition of the embodiment of the invention, it is preferable that a solid lubricating agent is also contained. Examples of the solid lubricating agent include a fluoride resin such as polytetrafluoroethylene, polyvinyl fluoride, perfluoroalkoxy fluoride resin, molybdenum disulfide, tungsten disulfide, graphite, carbon black, polyethylene, polypropylene, wax, and grease. According to the polyamideimide-based film coating composition of the embodiment of the invention, a solid lubricating agent is preferably at least one of molybdenum disulfide ($MoS_2$), polytetrafluoroethylene (PTFE), and graphite. More preferably, all of molybdenum disulfide, polytetrafluoroethylene, and graphite are included as a solid lubricating agent. By mixing these solid lubricating agents, a coating composition with excellent sliding characteristics including wear resistance and a smaller friction coefficient can be obtained. The sliding part indicates, for example, a piston, a shoe, or a shoe pocket of a tilting plate type compressor, or a cylinder bore or a piston skirt of a combustion engine. Further, as the polyamideimide-based film coating composition of the embodiment of the invention contains as a solvent γ-butyrolactone and cyclohexanone, the solid lubricating agent can be homogeneously dispersed and maintained in a dispersion state. The total content of the solid lubricating agent is not specifically limited in this embodiment. However, it is preferably 15 and 45 parts by weight compared to 100 parts by weight of the total solid components of the coating composition. More preferably, it is 25 and 35 parts by weight.

According to the polyamideimide-based film coating composition of the embodiment of the invention, it is also preferable that an epoxy resin is contained. The epoxy resin functions as a curing agent and it improves wear resistance of a coating film by cross linking and curing the polyamideimide resin. It can also improve an adhesion property of a coating film on a metal substrate. Further, as the polyamideimide-based film coating composition of the embodiment of the invention contains γ-butyrolactone and cyclohexanone as a solvent, it has excellent affinity for the epoxy resin and high solubility therefor. Thus, without having any precipitation or whitening, a curing reaction between the polyamideimide resin and the epoxy resin is not inhibited. In addition, without experiencing an occurrence of precipitates or gelled products according to passage of time, excellent storage stability is obtained. Type of the epoxy resin is not specifically limited and examples thereof include a bisphenol type A epoxy resin, a bisphenol type F epoxy resin, a novolac type epoxy resin, a diglycidyl ether type epoxy resin, a glycidyl ester type epoxy resin, a glycidylamine type epoxy resin, an aliphatic type epoxy resin, and an alicyclic type epoxy resin.

The total content of the epoxy resin is not specifically limited in this embodiment of the invention. Preferably, it is between 1 and 50% by weight compared to 100% by weight of the polyamideimide resin. More preferably, it is between 10 and 35% by weight. When it is less than 1% by weight, an effect of adding an epoxy resin may not be obtained. On the other hand, when it is more than 50% by weight, a coating film may become brittle, and thus wear resistance, adhesion property, and heat resistance may become deteriorated.

To the coating composition, various aiding agents such as a surface active agent and an anti-settling agent may be added as long as the effect of the invention is not impaired. For example, by adding a fluorine-based surface active agent as a surface active agent, polytetrafluoroethylene added as a solid lubricating agent can be homogeneously dispersed in the coating composition and maintained in a dispersion state. As for the fluorine-based surface active agent, a fluorine-based surface active agent other than the perfluoro surface active agent such as perfluorooctanoic acid with restricted use, is preferably used. Further, as the polyamideimide-based film coating composition of the embodiment of the invention contains γ-butyrolactone and cyclohexanone as a solvent, it shows excellent affinity for the fluorine-based surface active agent.

The polyamideimide-based film coating composition of the embodiment of the invention has the same viscosity characteristics as conventional coating composition, and therefore a coating film can be formed by the same process as that of the conventional coating composition. The process which is the same process as that of the conventional coating composition means a method of spray-coating on a substrate a polyamideimide-based film coating composition which is produced at solid component concentration suitable for coating and pre-heated to 80-100° C., drying the coated surface at 80-100° C. for 10 min or more, and baking it at 170-240° C. for 15 to 90 min. Further, the process which is the same as that of the conventional coating is not limited to it.

Concentration of the solid components in the polyamideimide-based film coating composition can be suitably adjusted to have the viscosity required for the coating method to be used.

EXAMPLES

Herein below, explanations are given in view of the Examples of the invention, but the invention is not limited to these Examples. Further, the addition parts are converted into the solid components, unless specifically described otherwise.

Example 1

50 Parts by weight (when converted into the polyamideimide resin) of the polyamideimide varnish (trade name: HPC5030, manufactured by Hitachi Chemical Company, Ltd.) (concentration of solid components; 32% by weight) in which a polyamideimide resin is dissolved as a binder in γ-butyrolactone was mixed with 15 parts by weight of epoxy resin, 15 parts by weight of molybdenum disulfide as a solid lubricating agent, 10 parts by weight of polytetrafluoroethylene, and 10 parts by weight of graphite. The resulting mixture was diluted by using γ-butyrolactone and cyclopentanone as a solvent to have the solid component concentration of 15% by weight followed by addition of a fluorine-based surface active agent and an anti-settling agent to produce a polyamideimide-based film coating composition. In this case, the volume ratio between the total volume of γ-butyrolactone in the polyamideimide resin varnish and γ-butyrolactone used for dilution and the volume of cyclopentanone was 70:30.

Example 2

The polyamideimide-based film coating composition was produced in view of the Example 1 except that the volume ratio between the total volume of γ-butyrolactone in the polyamideimide resin varnish and γ-butyrolactone used for dilution and the volume of cyclopentanone in the Example 1 is changed to 50:50.

Example 3

The polyamideimide-based film coating composition was produced in view of the Example 1 except that the volume ratio between the total volume of γ-butyrolactone in the polyamideimide resin varnish and γ-butyrolactone used for dilution and the volume of cyclopentanone in the Example 1 is changed to 95:5.

Example 4

The polyamideimide-based film coating composition was produced in view of the Example 1 except that the volume ratio between the total volume of γ-butyrolactone in the polyamideimide resin varnish and γ-butyrolactone used for dilution and the volume of cyclopentanone in the Example 1 is changed to 90:10.

Example 5

The polyamideimide-based film coating composition was produced in view of the Example 1 except that the volume ratio between the total volume of γ-butyrolactone in the polyamideimide resin varnish and γ-butyrolactone used for dilution and the volume of cyclopentanone in the Example 1 is changed to 80:20.

Example 6

The polyamideimide-based film coating composition was produced in view of the Example 1 except that the epoxy resin of the Example 1 is not added.

Comparative Example 1

The polyamideimide-based film coating composition was produced in view of the Example 1 except that γ-butyrolactone, methyl isobutyl ketone, and methyl ethyl ketone are used as a solvent used for dilution instead of γ-butyrolactone and cyclopentanone of Example 1. The volume ratio among γ-butyrolactone, methyl isobutyl ketone, and methyl ethyl ketone was 60:20:20.

Comparative Example 2

The polyamideimide-based film coating composition was produced in view of the Example 1 except that γ-butyrolactone and methyl isobutyl ketone are used as a solvent used for dilution instead of γ-butyrolactone and cyclopentanone of Example 1. The volume ratio between γ-butyrolactone and methyl isobutyl ketone was 70:30.

Comparative Example 3

The polyamideimide-based film coating composition was produced in view of the Example 1 except that γ-butyrolactone and methyl ethyl ketone are used as a solvent used for dilution instead of γ-butyrolactone and cyclopentanone of Example 1. The volume ratio between γ-butyrolactone and methyl ethyl ketone was 70:30.

Comparative Example 4

The polyamideimide-based film coating composition was produced in view of the Example 1 except that γ-butyrolactone and acetone are used as a solvent used for dilution instead of γ-butyrolactone and cyclopentanone of Example 1. The volume ratio between γ-butyrolactone and acetone was 70:30.

Comparative Example 5

The polyamideimide-based film coating composition was produced in view of the Example 1 except that γ-butyrolactone and ethanol are used as a solvent used for dilution instead of γ-butyrolactone and cyclopentanone of Example 1. The volume ratio between γ-butyrolactone and ethanol was 70:30.

Comparative Example 6

The polyamideimide-based film coating composition was produced in view of the Example 1 except that γ-butyrolactone and diacetone alcohol are used as a solvent used for dilution instead of γ-butyrolactone and cyclopentanone of Example 1. The volume ratio between γ-butyrolactone and diacetone alcohol was 70:30.

Comparative Example 7

The polyamideimide-based film coating composition was produced in view of the Example 1 except that the volume ratio between the total volume of γ-butyrolactone in the polyamideimide resin varnish and γ-butyrolactone used for dilution and the volume of cyclopentanone in the Example 1 is changed to 35:65.

Comparative Example 8

The polyamideimide-based film coating composition was produced in view of the Example 1 except that the volume ratio between the total volume of γ-butyrolactone in the polyamideimide resin varnish and γ-butyrolactone used for dilution and the volume of cyclopentanone in the Example 1 is changed to 30:70.

Comparative Example 9

The polyamideimide-based film coating composition was produced in view of the Example 1 except that the volume ratio between the total volume of γ-butyrolactone in the polyamideimide resin varnish and γ-butyrolactone used for dilution and the volume of cyclopentanone in the Example 1 is changed to 100:0.

Comparative Example 10

55 Parts by weight (when converted into the polyamideimide resin) of the polyamideimide varnish (trade name: HPC6000-26, manufactured by Hitachi Chemical Company, Ltd.) (concentration of solid components; 26% by weight) in which a polyamideimide resin is dissolved as a binder in N-methyl pyrrolidone was mixed with 10 parts by weight of epoxy resin, 15 parts by weight of molybdenum disulfide as a solid lubricating agent, 10 parts by weight of polytetrafluoroethylene, and 10 parts by weight of graphite. The resulting mixture was diluted by using N-methyl pyrrolidone, o-xylene, N,N-dimethyl acetamide, and 1,4-dioxane as a solvent to have the solid component concentration of 15% by weight to produce a polyamideimide-based film coating composition. In this case, the volume ratio among the total volume of N-methyl pyrrolidone in the polyamideimide resin varnish and N-methyl pyrrolidone used for dilution, the volume of o-xylene, the volume of N,N-dimethyl acetamide, and the volume of 1, 4-dioxane was 20:10:20:50.

The polyamideimide-based film coating compositions obtained from the Examples and the Comparative Examples were evaluated according to the following method. The evaluation results are given in Table 1.

TABLE 1

|  | Uniform dispersibility | Coating property | Drying property | Storage stability | Sliding characteristics | | Adhesion property |
|---|---|---|---|---|---|---|---|
|  |  |  |  |  | Wear resistance | Friction coefficient |  |
| Example 1 | + | + | + | + | ++ | ++ | + |
| Example 2 | − | + | + | + | ++ | ++ | + |
| Example 3 | + | − | + | + | ++ | ++ | + |

TABLE 1-continued

|  | Uniform dispersibility | Coating property | Drying property | Storage stability | Sliding characteristics | | Adhesion property |
|---|---|---|---|---|---|---|---|
|  |  |  |  |  | Wear resistance | Friction coefficient |  |
| Example 4 | + | − | + | + | ++ | ++ | + |
| Example 5 | + | + | + | + | ++ | ++ | + |
| Example 6 | + | + | + | + | − | ++ | + |
| Comparative Example 1 | −− | −− | −− | N/T | N/T | N/T | N/T |
| Comparative Example 2 | −− | −− | −− | N/T | N/T | N/T | N/T |
| Comparative Example 3 | −− | −− | −− | N/T | N/T | N/T | N/T |
| Comparative Example 4 | −− | −− | −− | N/T | N/T | N/T | N/T |
| Comparative Example 5 | −− | −− | −− | N/T | N/T | N/T | N/T |
| Comparative Example 6 | −− | −− | −− | N/T | N/T | N/T | N/T |
| Comparative Example 7 | −− | −− | −− | N/T | N/T | N/T | N/T |
| Comparative Example 8 | −− | −− | −− | N/T | N/T | N/T | N/T |
| Comparative Example 9 | − | − | + | + | ++ | ++ | + |
| Comparative Example 10 | + | + | + | + | + | ++ | + |

N/T: No test was carried out.

(Uniform Dispersibility)

Uniform dispersibility was examined for mixing and dispersing process for the polyamideimide-based film coating composition of the Examples and the Comparative Examples by visual determination of dispersion state of a solid lubricating agent and solubility of the polyamideimide resin. Regarding the solubility of the polyamideimide resin, the coating composition was visually examined to identify the presence or absence of aggregated polyamideimide resin. Criteria for the evaluation were as follows.

+: There were no aggregates during the dispersion process and in finished coating composition, and the polyamideimide resin was homogeneously dissolved (practically acceptable level).

−: It was not homogeneously dispersed during the intermediate dispersion process, but no aggregates were found in the coating composition of the final process, and the polyamideimide resin was homogeneously dissolved (lowest level for practical use).

−−: Due to decreased solubility, the polyamideimide resin was aggregated to yield gellation (practically unacceptable).

(Coating Property)

The polyamideimide-based film coating compositions of the Examples and the Comparative Examples were pre-heated to 90° C. and then spray-coated on the surface of a copper alloy disc (diameter; 100 mm, thickness; 5 mm) while fixing the coating condition to make the coating film thickness 10 μm. State of the coated surface was visually examined. Criteria for the evaluation were as follows.

+: The coated surface was even and good (practically acceptable level).

−−: The coated surface was uneven and bumps and stains were found (practically unacceptable level).

(Drying Property)

The coated surface obtained in evaluation of the coating property was dried at 90° C. for 10 min followed by baking at 190° C. for 1 hour to form a coating film. According to the JIS K5600-3-3 "Testing methods for paints—Part 3: Film formability—Section 3: Through-dry", the test was carried out. Criteria for the evaluation were as follows.

+: There were no dents or marks on the surface (practically acceptable level).

−−: There were dents or marks on the surface (practically unacceptable level).

(Storage Stability)

The polyamideimide-based film coating compositions obtained from the Examples and the Comparative Examples were added to a 100 ml test bottle. After sealing the bottle, the compositions were kept for 30 days at atmospheric temperature of 25° C. and atmospheric humidity of 50%. State of the coating composition was visually examined. Criteria for the evaluation were as follows.

++: No gelled product or precipitated product was found, a homogeneous state was obtained, and viscosity remained unchanged (practically acceptable level).

+: Precipitated product was found, but a homogenous state was obtained after re-dispersion, and viscosity remained unchanged (practically acceptable level).

−−: Gelled product and precipitated product were found, and no homogeneous state was obtained even after re-dispersion (practically unacceptable).

N/T: The polyamideimide resin was not dissolved in a solvent, therefore the test was not carried out.

(Sliding Characteristics—Wear Resistance)

The polyamideimide-based film coating compositions obtained from the Examples and the Comparative Examples were spray-coated on the surface of a copper alloy disc (diameter; 100 mm, thickness; 5 mm), which has been pre-heated to 90° C., to obtain the coating film thickness of 10 μm. The composition was then dried at 90° C. for 10 min and baked at 190° C. for 1 hour to form a coating film. The resulting coating film specimen was subjected to a reciprocating motion abrasion test using SUJ2 ball as a reference material. The sliding test condition includes 100 cycles at 15 mm/s. After the sliding test, abrasion depth of the coating film was measured. Criteria for the evaluation were as follows.

++: Abrasion depth at a site having the biggest abrasion was 3 μm or less (practically acceptable level).

+: Abrasion depth at a site having the biggest abrasion was greater than 3 μm but less than 5 μm (practically acceptable level).

−: Abrasion depth at a site having the biggest abrasion was greater than 5 μm but less than 7 μm (lowest level for practical use).

−−: Abrasion depth at a site having the biggest abrasion was 7 μm or more (practically unacceptable).

N/T: The polyamideimide resin was not dissolved in a solvent, therefore the test was not carried out.

(Sliding Characteristics—Friction Coefficient)

The polyamideimide-based film coating compositions obtained from the Examples and the Comparative Examples were spray-coated on the surface of a copper alloy disc (diameter; 100 mm, thickness; 5 mm), which has been pre-heated to 90° C., to obtain the coating film thickness of 10 μm. The composition was then dried at 90° C. for 10 min and baked at 190° C. for 1 hour to form a coating film. The resulting coating film specimen was subjected to a reciprocating motion abrasion test using SUJ2 ball as a reference material. The sliding test condition includes 100 cycles at 15 mm/s and the friction coefficient was measured for each cycle. Average friction coefficient (A) of the Comparative Example 10 was calculated and the difference compared to the average friction coefficient (B) of the Examples and other Comparative Examples was obtained (i.e., B−A). Criteria for the evaluation were as follows.

++: B−A was ±0.003 or less (practically acceptable level).

+: B−A was greater than 0.003 but less than 0.005 (practically acceptable level).

−: B−A was greater than 0.005 but less than 0.01 (lowest level for practical use).

B−A was 0.01 or more (practically unacceptable).

N/T: The polyamideimide resin was not dissolved in a solvent, therefore the test was not carried out.

(Adhesion Property)

According to JIS K5600-5-6: 1999 "Cross-cut method", one hundred grid-type cuts were formed (1 mm×1 mm, each), and the peeling test was carried out using an adhesive tape. Regarding the evaluation criteria, the same standard was employed for carrying out the evaluation.

0: (practically acceptable level).

1 to 5: (practically unacceptable).

N/T: The polyamideimide resin was not dissolved in a solvent, therefore the test was not carried out.

The polyamideimide-based film coating compositions of the Example 1 to the Example 6 do not contain any restricted substance or a substance which might possibly be a restricted one such as N-methyl pyrrolidone and N-ethyl pyrrolidone, and the solubility of the polyamideimide resin was good, the uniform dispersibility was excellent, and the coating film can be formed according to the same process as that of conventional coating composition. In addition, the coating film obtained has an excellent coating property, drying property, storage stability, sliding characteristics, and adhesion property. Comparing the Example 1 to the Example 6 in terms of wear resistance, it was found that the wear resistance is excellent in the Example 1 and it was improved by adding an epoxy resin. The Comparative Example 10 corresponds to a conventional coating composition, but the coating film formed with the polyamideimide-based film coating composition of the Example 1 to Example 5 exhibited the same or higher characteristics compared to the coating film formed with the coating composition of the Comparative Example 10.

In the Comparative Example 1 to Comparative Example 6, γ-butyrolactone and solvents other than cyclopentanone were used as a solvent instead of cyclopentanone, and as a result, the polyamideimide resin was aggregated to cause gellation, yielding poor uniform dispersibility and poor coating property. Further, as no cyclopentanone was contained, the drying property was poor. In the Comparative Example 7 and Comparative Example 8, the volume of γ-butyrolactone was less than 50% by volume compared to the total volume of γ-butyrolactone and cyclopentanone, and thus the polyamideimide resin showed poor solubility and poor uniform dispersibility. In the Comparative Example 9 in which only γ-butyrolactone was used without having cyclopentanone, both the uniform dispersibility and coating property were poor.

The polyamideimide-based film coating composition related to the invention can be used in the same manner as that of conventional coating composition and exhibits the same or better characteristics than those of the conventional composition, and therefore it can replace the conventional coating composition. It is appropriate as a polyamideimide-based film coating composition which is used for initial adaptation, improving wear resistance, lowering friction, and obtaining permanent lubrication in the field of an automotive, a machine for an automotive, a machine for industrial use, an OA instrument, or a household electronic appliance, etc.

What is claimed is:

1. A polyamideimide-based film coating composition comprising a polyamideimide resin and a solvent, the polyamideimide resin being dissolved as a binder in the solvent, wherein the solvent contains γ-butyrolactone and cyclopentanone, and a volume of γ-butyrolactone is 50% to 95% by volume compared to a total volume of γ-butyrolactone and cyclopentanone.

2. The polyamideimide-based film coating composition according to claim 1, further comprising a solid lubricating agent.

3. The polyamideimide-based film coating composition according to claim 2, wherein the solid lubricating agent is at least one of molybdenum disulfide, polytetrafluoroethylene, and graphite.

4. The polyamideimide-based film coating composition according to claim 1, further comprising an epoxy resin.

* * * * *